US007290254B2

(12) United States Patent
Comp et al.

(10) Patent No.: US 7,290,254 B2
(45) Date of Patent: Oct. 30, 2007

(54) COMBINING COMPILATION AND INSTRUCTION SET TRANSLATION

(75) Inventors: Lynn A. Comp, Round Rock, TX (US); Anthony Jebson, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 649 days.

(21) Appl. No.: 10/396,913

(22) Filed: Mar. 25, 2003

(65) Prior Publication Data

US 2004/0194076 A1 Sep. 30, 2004

(51) Int. Cl.
*G06F 9/45* (2006.01)
(52) U.S. Cl. ...................................... 717/158
(58) Field of Classification Search ........ 717/114–116, 717/128–131, 140, 145–158; 719/209
See application file for complete search history.

(56) References Cited

U.S. PATENT DOCUMENTS

| 5,970,249 A * | 10/1999 | Holzle et al. ............... 717/153 |
| 6,014,723 A * | 1/2000 | Tremblay et al. ............. 711/1 |
| 6,298,477 B1 * | 10/2001 | Kessler ...................... 717/145 |
| 6,317,796 B1 * | 11/2001 | Bak et al. .................... 719/315 |
| 6,351,844 B1 * | 2/2002 | Bala ........................... 717/128 |
| 6,374,351 B2 * | 4/2002 | Tremblay ................... 712/239 |
| 7,039,910 B2 * | 5/2006 | Kosche et al. .............. 717/158 |
| 2004/0003384 A1 * | 1/2004 | Pechtchanski et al. ...... 717/158 |

OTHER PUBLICATIONS

Ammons et al, "Exploiting Hardware Performance Counters with Flow and Context Sensitive Profiling", ACM Sigplan Conference on Programming Language Design and Implementation—Jun. 1997, pp. 1-12.*
Adl-Tabatabai, Ali-Reza, et al. The StarJIt Compiler: A Dynamic Complier for Managed Runtime Environments. Intel Technology Journal, vol. 7, Issue 01; pp. 19-27. Published Feb. 19, 2003.
Ciemiak, Michal, et al. The Open Runtime Platform: A Flexible High-Performance Managed Runtime Environment. Intel Technology Journal, vol. 7, Issue 01; pp. 5-15. Published Feb. 19, 2003.

* cited by examiner

*Primary Examiner*—Tuan A Vu
(74) *Attorney, Agent, or Firm*—Trop, Pruner & Hu, P.C.

(57) ABSTRACT

In one embodiment of the present invention, a method includes translating instructions of a code portion from a first instruction set to a native instruction set; and disabling of translating the instructions when a compilation process is ready for execution.

9 Claims, 3 Drawing Sheets

COMBINING COMPILATION AND INSTRUCTION SET TRANSLATION

BACKGROUND

Certain modern programming languages such as the JAVA™ language and C# execute in a managed runtime environment (MRTE) that provides automatic memory management and dynamic loading facilities, among other features. MRTEs dynamically load and execute code that is delivered in a portable format. Thus, that code must be converted into native instructions via interpretation or compilation. Code and other related data may be loaded from disk, read from a network stream, or synthesized in memory by an application. Methods include bytecodes to specify what to do when the method is invoked. Such bytecodes are machine independent and at a higher abstraction level than native instructions. Thus the MRTE converts bytecodes into native instructions.

A JAVA™ Virtual Machine (JVM) is a software layer used to execute JAVA™ bytecodes. Such JVMs can suffer from poor performance, including costly overhead. One manner of avoiding such problems is using just-in-time (JIT) compilation to implement a JVM.

Through JIT compilation, a bytecode method is translated into a native method on the fly, which may desirably remove interpretation overhead. However the JIT compilation is part of the total execution time of a JAVA™ program.

Current JIT compilation and instruction set translation do not operate smoothly together. Each approach has a benefit and a penalty. The compilation process cannot provide the system a benefit until the code is executed using an interpreter and past history on the system and software behavior is collected. Instruction set translation cannot benefit system behavior as efficiently as a compiled process because reordering of instructions and code sequences cannot be done by what is essentially a "look up table."

A need thus exists to provide for better cooperation between compilation and instruction set translation.

DETAILED DESCRIPTION

Figure 1:
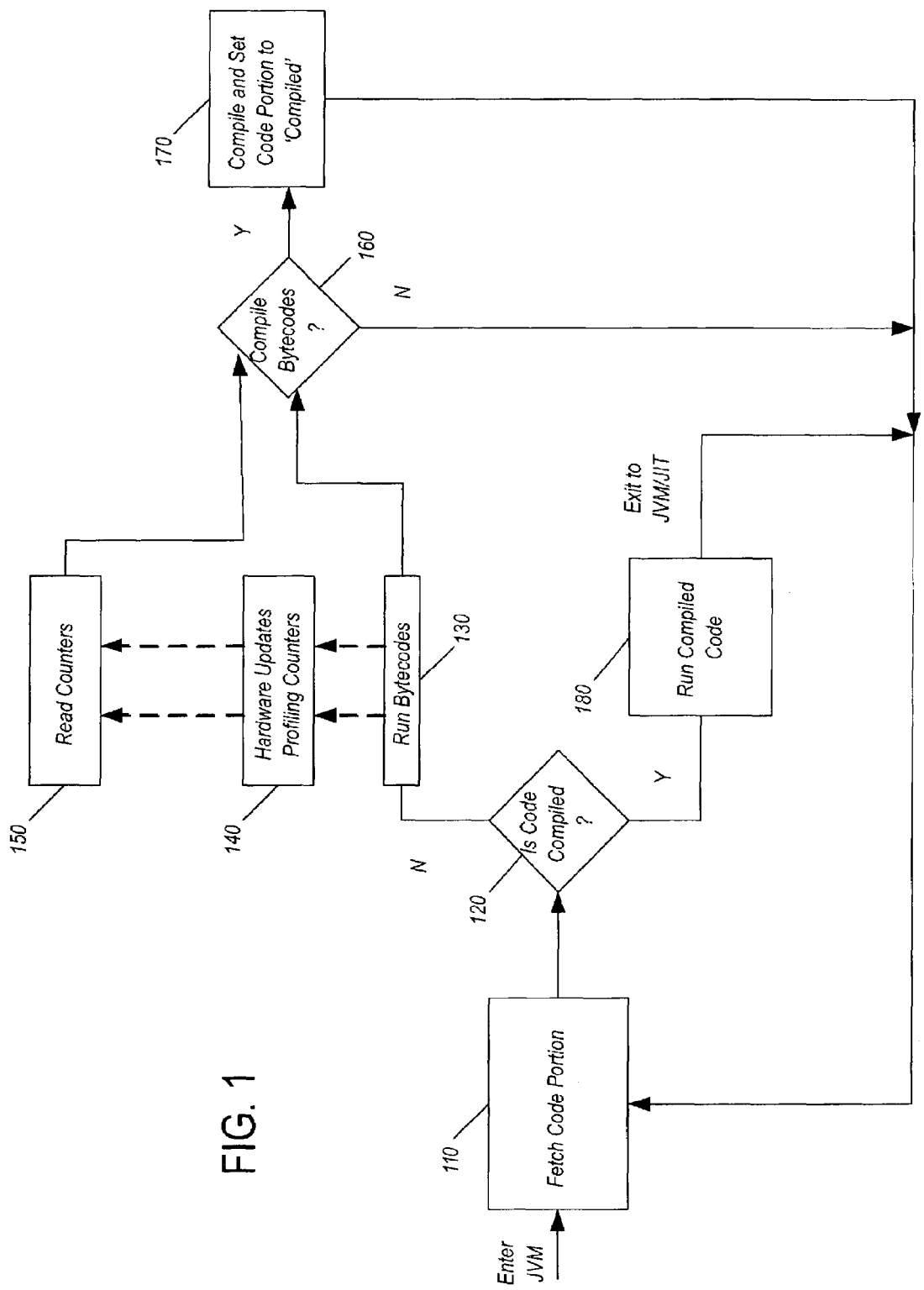
FIG. 1 is a flow diagram of a method in accordance with one embodiment of the present invention.

Referring now to FIG. 1, shown is a flow diagram of a method in accordance with one embodiment of the present invention. As shown in FIG. 1, a code portion may be fetched (block 110). In the embodiment of FIG. 1, the code portion may be fetched using a JVM. In one embodiment, the code portion may be a portion of JAVA™ code or .NET code stored in memory, such as a flash memory. Next, the code portion may be analyzed to determine whether the code portion has been previously compiled (diamond 120). If so, the compiled code may be run (block 180) and control returns to block 110, at which point another portion of code is fetched.

As shown in the embodiment of FIG. 1, if the code portion has not been compiled, control next passes to block 130 in which bytecodes of the code portion are executed. During such execution, hardware updates profiling counters (block 140). The profiling counters will be discussed in more detail below. At the conclusion of executing the bytecodes for the range of the code portion, the profiling counters may be read (block 150).

Next, in one embodiment it may be determined whether to compile the bytecodes (diamond 160). The decision whether to compile on a given run may be based upon the values contained in the profile counters of different embodiments of the present invention. For example, based on one or more of the counters, it may be determined that the code portion is of sufficient importance (e.g., based on runtime or the like) to undergo compiling.

In one embodiment, software reading the counters (for example profiling middleware or firmware) may also determine whether to disable the profiling counters from further updating, as well as whether to disable instruction set translation (i.e., execution of bytecodes)(not shown in FIG. 1). For example, when a JIT compiler is ready for handoff, it may cause the profile counters and instruction set translation to be disabled. While the determination of whether to disable the counters may vary in different embodiments, in one embodiment the counters may be compared to predetermined parameters (i.e., thresholds). If the counters are not disabled, information stored in the counters (e.g., statistics) may be stored in memory for later retrieval and use in a later run of the same code portion. More so, instruction set translation continues.

In certain embodiments, profiling middleware may be used to collect data from the counters. In one such embodiment, middleware may track the counters for a specific number of high level code loops to determine basic behavior of a high level application using low level system hardware. In certain embodiments, a large number of executions of a code portion may be performed before sufficient information exists in the counters. For example, in certain embodiments, between approximately 500 and 2,000 runs may occur before the counters are disabled, and in one embodiment, approximately 1000 runs may occur.

If it is determined to compile the bytecodes, next a compilation process, such as a JIT compilation, may be performed on the code portion (block 170). As discussed, software (such as supervisor mode middleware) may cause disabling of the counters and instruction set translation at compilation handoff.

While the location of a JIT compiler may vary in one embodiment it may reside and execute from on chip memory. Alternately, such a compiler may reside in off chip memory in other embodiments. After compiling, the compiled code portion may be stored to memory along with an indication of its state as being compiled (block 170). Control then passes back to block 110 as discussed above. Alternately, if it was determined not to compile the code, control may pass directly from diamond 160 to block 110.

Figure 2:
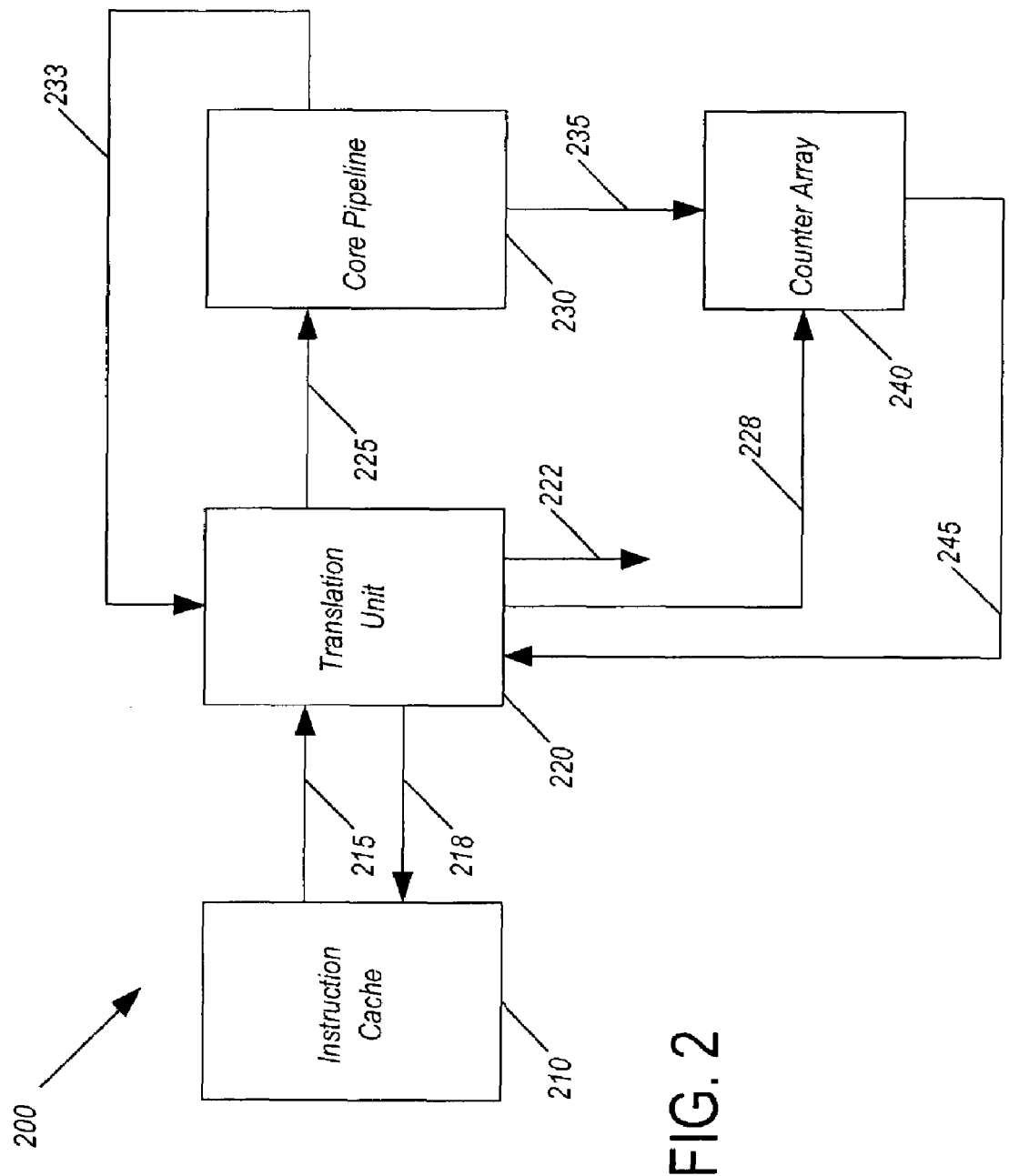
FIG. 2 is a block diagram of a portion of a processor in accordance with one embodiment of the present invention.

Referring now to FIG. 2, shown is a block diagram of a portion of a processor in accordance with one embodiment of the present invention. As shown in FIG. 2, processor 200 may include an instruction cache 210, translation unit 220, a core pipeline 230, and a counter array 240. In one embodiment, processor 200 may have a reduced instruction set computing (RISC) architecture, such as an architecture based on Advanced RISC Machines (ARM) architecture. For example, in one embodiment processor 200 may be a 32-bit version of an XSCALE™ processor available from Intel Corporation, Santa Clara, Calif.

As shown in FIG. 2, instruction cache 210 may be coupled to translation unit 220 to provide code 215 to the translation unit 220. As required, translation unit 220 may provide fetch instructions 218 to instruction cache 210 to obtain additional code 215.

In one embodiment, translation unit 220 may include a bytecode scheduler to perform instruction set translation (e.g., translate JAVA™ bytecodes to ARM instructions). Such ARM instructions 225 may be provided to core pipeline unit 230 which, in such an embodiment may be an ARM pipeline that executes ARM instructions. While the number of stages may vary, in certain embodiments a core pipeline having seven or more stages may be used. Translation unit 220 may also be coupled to counter array 240 to provide counter numbers thereto, as will be discussed in more detail below. More so, translation unit 220 may send exceptions 222 for instructions causing out of range memory locations.

During execution of instructions in core pipeline 230, certain data regarding execution of the instructions may be provided to one or more counters in counter array 240 via lines 235. Such data may include information regarding branches taken, branches not taken, mispredicted branches, a loop counter, bytecode type and the like. For example, counters on branch prediction and branch taken logic may be used to list what branches were predicted and which addresses were taken. In certain embodiments, counters for memory accesses or locations accessed may also be present. While shown in FIG. 2 as a counter array, it is to be understood that in different embodiments, counters need not be structured as an array. Further in other embodiments, profiling counters may be located elsewhere, for example, in translation unit 220.

As shown in FIG. 2, lines 245 may be used to provide traces from counter array 240 to translation unit 220. Such traces may be used to provide information to translation unit 220 regarding counts of variables used by translation unit 220. For example, translation unit 220 may include a set number of registers or variables within its logic to help it run stack operations efficiently. In such an embodiment, lines 245 may provide information regarding those variables. In particular, the information may include how many times they overflow as, in certain embodiments, only four to eight variables may be tracked in the logic, and the compiler would need to know if it should allocate variables to more registers directly for most efficient operation. As shown in FIG. 2, lines 228 may be used to provide counter number information to counter array 240 from translation unit 220.

In various embodiments of the present invention, a plurality of counters and disable switches therefor, along with certain software such as middleware may be provided. Such components may allow JIT compilation and instruction set translation to be combined such that the instruction set translation does not negate the ability of the compiler to profile the code behavior, but while the profiling is occurring, the high level code is directly executed rather than being emulated.

In certain embodiments, one counter may store information regarding variable names. In the JAVA™ language, such variable names may be equivalent to memory accesses in an object-oriented language such as C++. In one embodiment, counters may be present to count the number of times a code portion uses, for example, a group of variable names.

As discussed above, in various embodiments the profiling counters and instruction set translation may be disabled when compiling is to begin. As shown in FIG. 2, such disabling may be performed by software causing core pipeline 230 to turn off translation unit 220 via a switch signal sent on line 233 and to turn off counter array 240 via a switch signal sent via lines 235. In different embodiments, such switches may be located inside or outside of counter array 240 and translation unit 220, respectively.

Embodiments of the present invention may be implemented in code and may be stored on a storage medium having stored thereon instructions which can be used to program a system, such as a wireless device to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any type of media suitable for storing electronic instructions.

Figure 3:
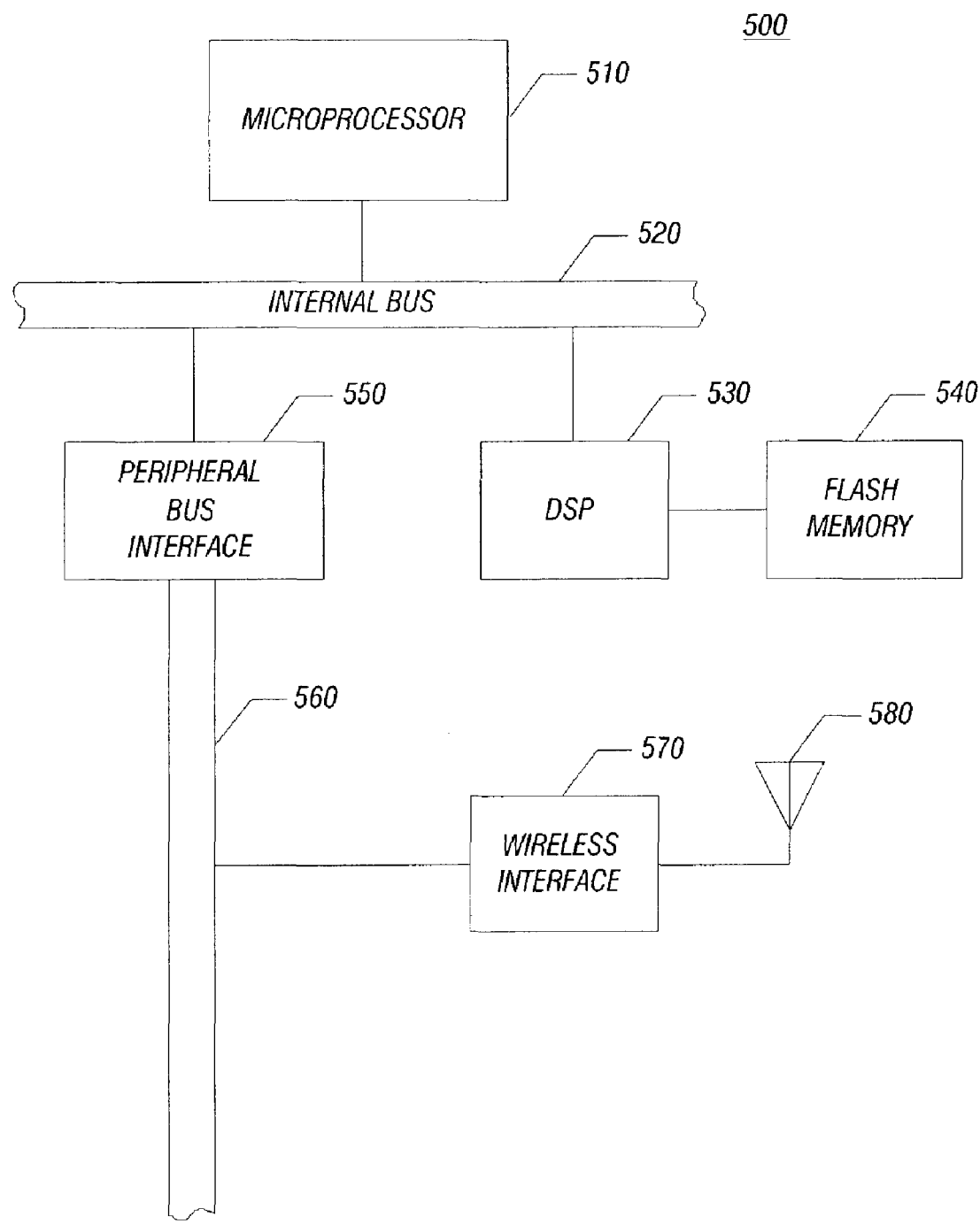
FIG. 3 is a block diagram of a wireless device with which embodiments of the invention may be used.

FIG. 3 is a block diagram of a wireless device with which embodiments of the invention may be used. As shown in FIG. 3, in one embodiment wireless device 500 includes a processor 510, which may include a general-purpose or special-purpose processor such as a microprocessor, microcontroller, application specific integrated circuit (ASIC), a programmable gate array (PGA), and the like. Processor 510 may be coupled to a digital signal processor (DSP) 530 via an internal bus 520. In turn, DSP 530 may be coupled to a flash memory 540.

As shown in FIG. 3, microprocessor device 510 may also be coupled to a peripheral bus interface 550 and a peripheral bus 560. While many devices may be coupled to peripheral bus 560, shown in FIG. 3 is a wireless interface 570 which is in turn coupled to an antenna 580. In various embodiments antenna 580 may be a dipole antenna, helical antenna, global system for mobile communication (GSM) or another such antenna.

Although the description makes reference to specific components of device 500, it is contemplated that numerous modifications and variations of the described and illustrated embodiments may be possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for optimizing profiling and compilation of a target program using a compiler coupled to a processor unit, the method comprising:
   (a) transferring uncompiled instructions of the target program from a flash memory to an instruction cache;
   (b) translating the transferred uncompiled instructions from a set of instructions to a pre-compiled set of instructions using a translating software while simultaneously using a profiling software to profile the set of instructions to determine a plurality of profile values;
   (c) transferring the previously determined plurality of profiles values from step (b) to at least one hardware profile counter and storing the previously determined plurality of profile values in the at least one hardware profile counter, wherein the processor unit is coupled to the at least one hardware profile counter and the at least one hardware profile counter is coupled to a hardware switch;
   (d) using a compiler support software to perform a determination that the pre-compiled set of instructions resulting from step (b) are ready for compilation by the compiler based on the compiler support software reading of one or more of the previously stored plurality of profile values;

(e) disabling of further translating and profiling of the set of instructions as performed in (b) based on comparing one or more of the profile values transferred in (c) to one or more predetermined values; the disabling further including disabling the at least one hardware profile counter using the compiler support software to act upon the hardware switch after the pre-compiled set of instructions are determined ready for compilation; and (f) to accomplish optimization of profiling and compiling of the target program, repeating steps (a), (b), and (c) for the remaining set of instructions until steps (b) and (c) are disabled based on steps (d) and (e).

2. The method of claim 1, wherein the set of instructions comprises bytecodes.

3. The method of claim 1, further comprising compiling the target program.

4. The method of claim 3, wherein compiling the target program comprises performing just-in-time compilation.

5. The method of claim 1, wherein the translating software includes a bytecode scheduler, the profiling software includes the compiler support software, and the compiler support software includes at least one of a middleware and a firmware.

6. The method of claim 1, wherein the compiler includes the profiling software.

7. An article comprising a medium storing instructions that enable a processor-based system using a compiler coupled to a processor unit to:

(a) transfer uncompiled instructions of a target program from a flash memory to an instruction cache;

(b) translate the transferred uncompiled instructions from a set of instructions to a pre-compiled set of instructions using a translating software while simultaneously using a profiling software to profile the set of instructions to determine a plurality of profile values;

(c) transferring the previously determined plurality of profiles values from step (b) to at least one hardware profile counter and store the previously determined plurality of profile values in the at least one hardware profile counter; wherein the processor unit is coupled to the at least one hardware profile counter and the at least one hardware profile counter is coupled to a hardware switch;

(d) using a compiler support software to perform a determination that the pre-compiled set of instructions resulting from step (b) are ready for compilation by the compiler based on the compiler support software reading of one or more of the previously stored plurality of profile values;

(e) disable of further translating and profiling of the set of instructions as performed in (b) based on comparing one or more of the profile values transferred in (c) to one or more predetermined values; the disabling further including disabling the at least one hardware profile counter using the compiler support software to act upon the hardware switch after the pre-compiled set of instructions are determined ready for compilation; and (f) to accomplish optimization of profiling and compiling of the target program, repeating steps (a), (b), and (c) for the remaining set of instructions until steps (b) and (c) are disabled based on steps (d) and (e).

8. The article of claim 7, further storing instructions that enable the processor-based system to convert bytecodes into pre-compiled set of instructions via a translation unit while the processor unit is to profile the byte codes.

9. The article of claim 8, further storing instructions tat enable the processor-based system to disable the translation unit based on the comparison of one or more of the profile values and one or more of the predetermined values.

* * * * *

UNITED STATES PATENT AND TRADEMARK OFFICE
CERTIFICATE OF CORRECTION

PATENT NO. : 7,290,254 B2
APPLICATION NO. : 10/396913
DATED : October 30, 2007
INVENTOR(S) : Lynn A. Comp and Anthony Jebson It is certified that error appears in the above-identified patent and that said Letters Patent is hereby corrected as shown below:

Column 6:
Line 33, "tat" should be --that--.

Signed and Sealed this

Eighteenth Day of March, 2008

JON W. DUDAS
*Director of the United States Patent and Trademark Office*